Figure 1:
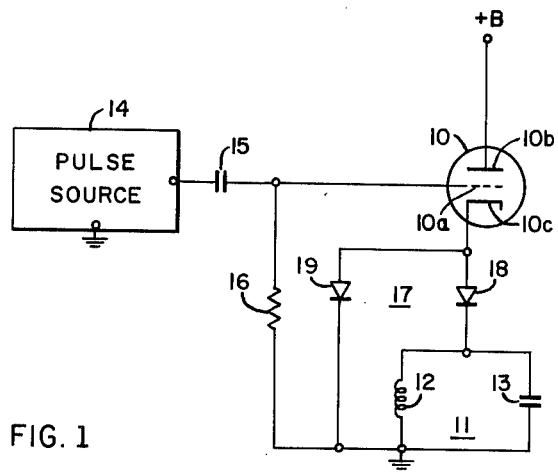

3,200,350
RINGING CIRCUIT WITH MEANS PREVENTING DAMPED OSCILLATIONS
Paul K. Sharp, Beech Grove, Ind., assignor to Hazeltine Research, Inc., a corporation of Illinois
Filed Sept. 15, 1961, Ser. No. 138,341
3 Claims. (Cl. 331—166)

General

This invention relates to a ringing circuit and particularly to one in which damped oscillations which otherwise follow desired oscillations are entirely removed.

In accordance with the present invention a ringing circuit comprises an initially conductive electronic valve having an input electrode and a pair of output electrodes and a resonant circuit responsive to the current flow through the electronic valve. The ringing circuit additionally includes means for applying a pulse of predetermined duration to the input electrode for altering the conductivity of the electronic valve for a predetermined period during which full cycle oscillations are produced in the resonant circuit. The ringing circuit finally includes means including a first diode connected between the resonant circuit and one of the output electrodes, the other of which is coupled to a source of unidirectional potential, and a second diode connected between the one output electrode and ground potential for short circuiting the resonant circuit after expiration of the predetermined period, thereby discontinuing the full cycle oscillations.

For a better understanding of the present invention, together with other and further objects thereof, reference is had to the following description taken in connection with the accompanying drawing, and its scope will be pointed out in the appended claims.

Figure 2:
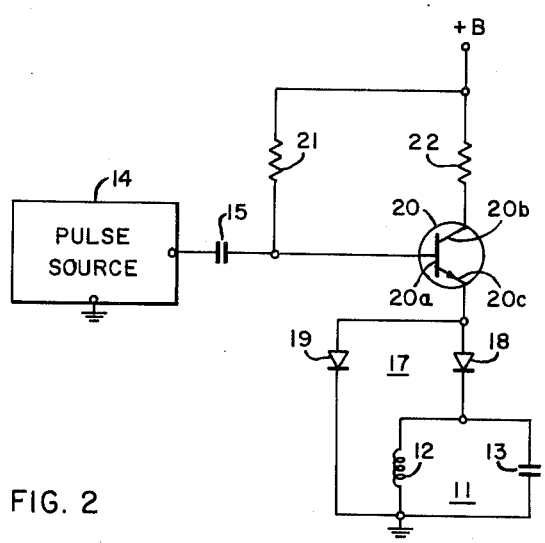

Referring to the drawing:

FIG. 1 shows a vacuum tube version of a ringing circuit constructed in accordance with the present invention, and FIG. 2 shows a transistor version of a ringing circuit constructed in accordance with the present invention.

Description and operation of the ringing circuit

A ringing circuit constructed in accordance with the present invention is generally similar in construction to the ringing circuit shown in Fig. 37(A) on page 2–70 of Principles of Radar, MIT Radar School Staff, 2nd Edition, published by McGraw-Hill Book Co., Inc.

Referring to FIG. 1 of the drawing, the ringing circuit includes an initially conductive electronic valve 10 shown as a vacuum tube triode and having a control electrode 10a, an anode electrode 10b and a cathode electrode 10c. The anode eletcrode 10b is connected to a source of positive potential +B. The ringing circuit additionally includes a resonant circuit 11 including an inductor 12 and a capacitor 13. The ringing circuit also includes means for altering the conductivity of the vacuum tube 10 for a predetermined period during which oscillations are produced in the resonant circuit 11. This means may include a pulse source 14, a coupling capacitor 15 connected between the pulse source 14 and the control electrode 10a and a control electrode resistor 16 connected between the control electrode 10a and ground potential. The ringing circuit finally includes means 17 for short circuiting the resonant circuit 11 after the expiration of the aforesaid predetermined period, thereby discontinuing the oscillations. Means 17 may include a first diode 18, connected between the cathode electrode 10c and the resonant circuit 11 and a second diode 19 connected between the cathode electrode 10c and ground potential.

Prior to the introduction of a pulse from the pulse source 14, vacuum tube 10 is conductive and a steady current flows therethrough to the inductor 12. When a negative pulse of sufficient amplitude and predetermined duration is supplied by the pulse source 14, through the coupling capacitor 15 to the control electrode 10a, vacuum tube 10 is rendered nonconductive for the duration of the pulse. The current flowing through inductor 12 flows into capacitor 13 thereby starting oscillations. Oscillations are produced in the resonant circuit 11 in a manner well known to those skilled in the art, for the duration of the pulse supplied by the pulse source 14. At the end of the pulse, vacuum tube 10 again conducts. In the absence of diodes 18 and 19 the resistance of the vacuum tube, effectively in parallel with the resonant circuit 11, causes a series of damped oscillations to be developed. Due to the presence of diodes 18 and 19, the resonant circuit is effectively short-circuited after the expiration of the pulse and no damped oscillations are developed. When the first negative half-cycle of oscillation, after the pulse is terminated, tends to be developed, the resonant circuit is at the same potential as the cathode electrode 10c due to diode 18. Since the cathode electrode potential is positive, the diode 19 effectively causes a short circuit across the resonant circuit 11 thereby discontinuing any further oscillations.

The transistor version of the ringing circuit constructed in accordance with the present invention is shown in FIG. 2 and is essentially the same as the vacuum tube circuit except for the inclusion of conventional base and collector biasing resistors 21 and 22, respectively. The elements in FIG. 2 which are the same as in FIG. 1 have been given the same reference numerals.

The current flowing through the initially conductive transistor 20 flows to the inductor 12. When a negative pulse of sufficient amplitude and predetermined duration is supplied by the pulse source 14 through the coupling capacitor 15 to the base electrode 20a of transistor 20, the transistor is rendered nonconductive for the duration of the pulse. The current flowing through inductor 12 flows into the capacitor 13 thereby starting oscillations. Oscillations are produced in the resonant circuit 11 which includes the inductor 12 and the capacitor 13 in a well-known manner to those skilled in the art for the duration of the pulse supplied by the pulse source 14. After the pulse terminates transistor 20 again conducts. When the first negative half cycle of oscillation, after the pulse is terminated, tends to be developed, the resonant circuit 11 is at the same potential as the emitter electrode 20c of transistor 20 due to the diode 18 which is connected between the emitter electrode 20c and the resonant circuit 11. Since the emitter electrode potential is positive at this time, the diode 19 connected between the emitter electrode 20c and ground potential effectively causes a short circuit across the resonant circuit 11 thereby discontinuing any further oscillations.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A ringing circuit comprising: an initially conductive electronic valve having an input electrode and a pair of output electrodes; a resonant circuit responsive to current flow through said electronic valve; means for applying a pulse of predetermined duration to said input electrode for altering the conductivity of said electronic valve for said predetermined duration during which full cycle oscillations are produced in said resonant circuit; and means including a first diode connected between said resonant circuit and one of said output electrodes, the other of which is coupled to a source of unidirectional potential, and a second diode connected between said one output electrode and ground potential for short circuiting said resonant circuit after the expiration of said predetermined duration, thereby discontinuing said full cycle oscillations.

2. A ringing circuit comprising: an initially conductive vacuum tube having a control electrode, an anode electrode, coupled to a source of positive unidirectional potential, and a cathode electrode; a resonant circuit responsive to current flow through said vacuum tube; means coupled to said control electrode for altering the conductivity of said vacuum tube for a predetermined period during which undamped full cycle oscillations are produced in said resonant circuit and after which damped full cycle oscillations are produced therein; and means including a first diode connected between said cathode electrode and said resonant circuit and a second diode connected between said cathode electrode and ground potential for short circuiting said resonant circuit after the expiration of said predetermined period, thereby discontinuing said damped full cycle oscillations.

3. A ringing circuit comprising: an initially conductive transistor having a base electrode, a collector electrode coupled to a source of positive unidirectional potential, and an emitter electrode; a resonant circuit responsive to current flow through said transistor; means coupled to said base electrode for altering the conductivity of said transistor for a predetermined period during which undamped full cycle oscillations are produced in said resonant circuit and after which damped full cycle oscillations are produced therein; and means including a first diode connected between said emitter electrode and said resonant circuit and a second diode connected between said emitter electrode and ground potential for short circuiting said resonant circuit after the expiration of said predetermined period, thereby discontinuing said damped full cycle oscillations.

References Cited by the Examiner

UNITED STATES PATENTS

| | | | |
|---|---|---|---|
| 2,143,366 | 1/39 | Andrieu | 331—165 X |
| 2,389,004 | 11/45 | Schroeder | 331—173 X |
| 2,470,573 | 5/49 | Moore | 331—173 X |
| 2,594,336 | 4/52 | Mohr | 307—88.5 X |
| 2,635,185 | 4/53 | Casey | 331—166 X |
| 2,741,701 | 4/56 | Harris | 331—166 |
| 3,017,580 | 1/62 | Phillips | 331—166 |

ROY LAKE, *Primary Examiner.*

BENNETT G. MILLER, *Examiner.*